United States Patent [19]

Strother

[11] 3,751,594

[45] Aug. 7, 1973

[54] TELEPHONE ALARM

[76] Inventor: John Strother, 175 W. 137th St., New York, N.Y. 10030

[22] Filed: May 18, 1972

[21] Appl. No.: 254,549

[52] U.S. Cl. ................. 179/5 P, 200/158, 307/133, 318/282

[51] Int. Cl. .......................................... H04m 11/04

[58] Field of Search ............................ 179/5 R, 5 P; 200/158; 307/133, 141; 318/467, 282

[56] References Cited

UNITED STATES PATENTS

| | | | |
|---|---|---|---|
| 2,501,274 | 3/1950 | Hamilton | 200/158 |
| 3,493,233 | 2/1970 | Foufounis | 200/158 |
| 3,679,951 | 7/1972 | Whitlock | 307/141 |
| 2,896,707 | 7/1959 | Jennings | 200/158 |
| 3,054,038 | 9/1962 | Rast | 318/467 |

*Primary Examiner*—William C. Cooper
*Assistant Examiner*—David L. Stewart
*Attorney*—Alexander B. Blair and Elton H. Brown, Jr.

[57] ABSTRACT

A telephone alarm in which when triggered by the breaking or making of an alarm circuit raises the receiver of the telephone, dials a police or fire number and plays a recording over the telephone giving the necessary information concerning the energency. A timer is provided for rendering the alarm operative during certain periods of a day and inoperative during other periods of the day to permit normal ingress and egress without triggering the alarm.

1 Claim, 4 Drawing Figures

TELEPHONE ALARM

CROSS REFERENCE TO RELATED PATENT

The present invention is an improvement on my prior U.S. Pat. No. 2,769,032 issued Oct. 30, 1956 entitled TELEPHONE ALARM.

BACKGROUND OF THE INVENTION

FIELD OF THE INVENTION

The present invention relates to automatic telephone alarms in which a telephone emergency number is dialed in order to transmit emergency information from the home to the police.

SUMMARY OF THE INVENTION

The present invention includes an apparatus for dialing a telephone to connect it to a police station and then playing a recording over the phone to give the nature of the emergency to the police. A timer renders the alarm active during certain periods of the day and inactive during other periods of the day to permit normal ingress and egress from the home.

The primary object of the invention is to provide a completely automatic telephone alarm system for notifying the police of an emergency during preselected periods of the day.

Other objects and advantages will become apparent in the following specification when considered in the light of the attached drawings.

DESCRIPTION OF THE PREFERRED EMBODIMENT

Figures 1, 2, 3, 4:
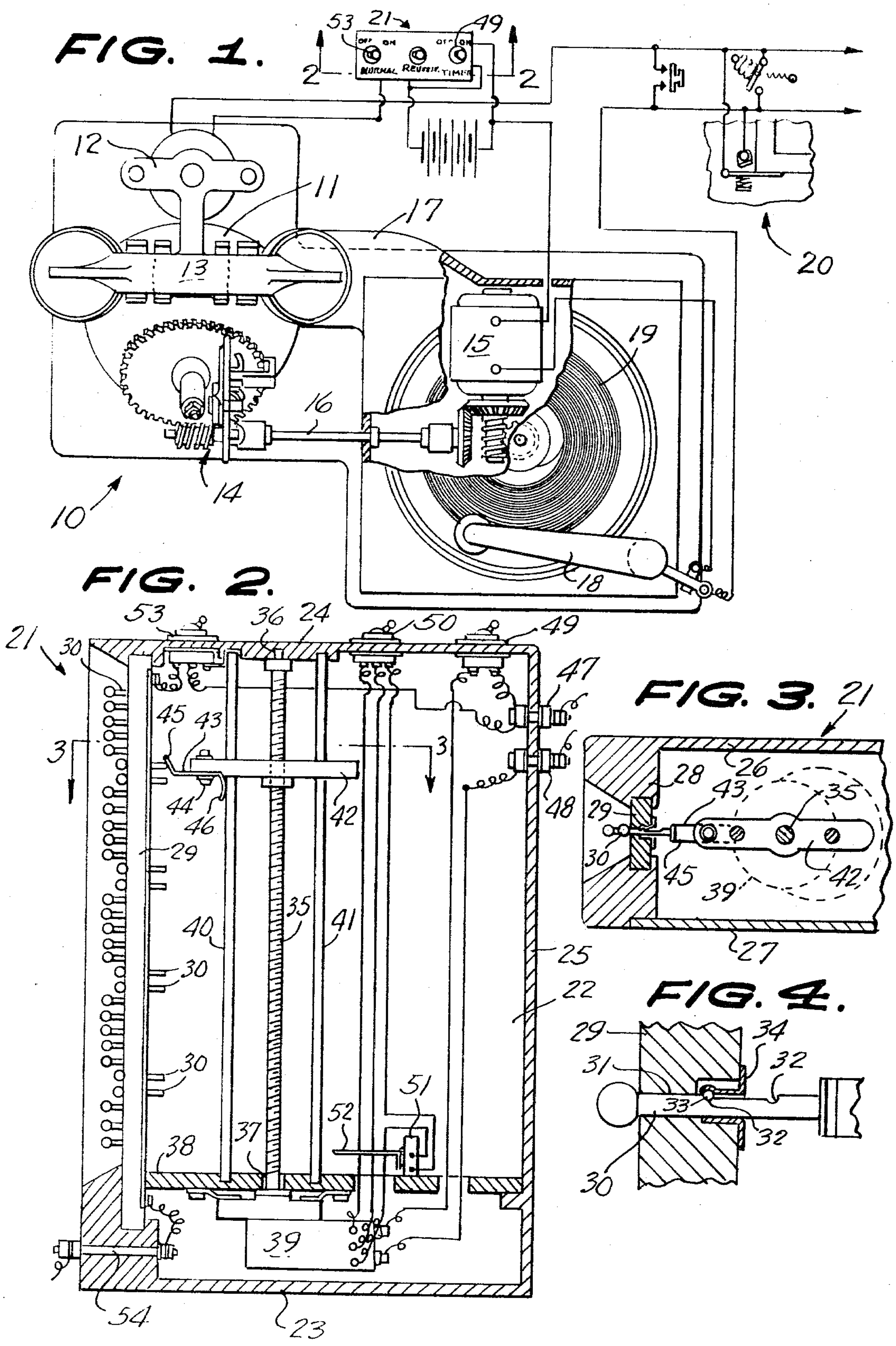
FIG. 1 is a top plan view of the invention shown partially broken away and in section for convenience of illustration and illustrating the electrical circuit involved.
FIG. 2 is a vertical sectional view taken along the line 2—2 of FIG. 1 looking in the direction of the arrows.
FIG. 3 is a horizontal sectional view taken along the line 3—3 of FIG. 2 looking in the direction of the arrows.
FIG. 4 is an enlarged sectional view of one of the contact pins.

Referring now to the drawings in detail wherein like reference characters indicate like parts throughout the several figures the reference numeral 10 indicates generally a telephone alarm constructed in accordance with the invention.

The telephone alarm 10 includes a telephone 11 having a mechanism 12 for raising the hand set 13 to energize the telephone 11. A mechanism generally indicated at 14 is provided for dialing a preselected number on the telephone dial when actuated by a motor 15 connected thereto through a shaft 16. A horn 17 extends from the tone arm 18 of a record player 19 to transmit the voice through the telephone 11 giving information to the police concerning the nature of the emergency and its location. The structure described above is essentially the same as the structure described in my aforementioned U.S. Pat. No. 2,769,032 but may be varied to dial a single emergency number when such is available.

Alarm circuits generally indicated at 20 are associated with the telephone alarm 10 to give an indication that the premises have been entered by unauthorized persons. The alarm circuits 20 are essentially the same as those described in my aforementioned patent.

A timer indicated generally at 21 is combined with the telephone alarm 10 to render the telephone alarm 10 active during certain periods of the day and inactive during other periods of the day to permit normal ingress and egress from the home.

The timer 21 includes a generally rectangular box 22 having a bottom wall 23, a top wall 24, and an upstanding end wall 25. The timer 21 has a rear wall 26 and a removable front wall 27 to permit access to the interior thereof. A slotted side wall 28 is positioned opposite the side wall 25 in spaced parallel relation thereto and supports an upright contact bar 29 mounted therein. A plurality of headed contact pins 30 are arranged in spaced apart parallel relation along the contact bar 29 and are mounted to slide in bores 31 formed therein as can be clearly seen in FIG. 4. The pins 30 have a pair of detent sockets 32 formed therein in spaced relation to receive a detent ball 33 which selectively engages therein to lock the pin 30 in its active or inactive position. A collar 34 supports the ball 33 in its pin engaging position.

A threaded shaft 35 is journaled at 36 in the top wall 24 with its lower end extending through a bore 37 in a partition 38 parallel and spaced from the bottom wall 23. The lower end of the shaft 35 is mounted in and driven by a reversible electric motor 39 mounted on and positioned below the partition 38. A pair of guide shafts 40, 41 are arranged in spaced parallel relation to the shaft 35 and on opposite sides thereof.

A carriage 42 is mounted on the threaded shaft 35 in threaded engagement therewith and has the guide shafts 40, 41 extending therethrough. A flexible metal contact strip 43 is secured to the carriage 42 by a bolt 44. The contact strip 43 has an upwardly flared end portion 45 for contacting the pins 30 and a downwardly projecting opposite end portion 46 for contacting the guide shaft 40.

A pair of terminals 47, 48 are mounted in the side wall 25 and connected to a source of electricity. An off-on switch 49 is mounted in the top wall 24 and is connected between the terminal 47 and the reversible electric motor 39. The terminal 48 is also connected to the reversible electric motor 39 to provide a source of electricity therefor.

A three wire reversing switch 50 is mounted on the top wall 25 and connected to the reversible electric motor 39 with one leg thereof extending through a limit switch 51 having an arm 52 positioned to be contacted by the carriage 42 so as to stop the motor 39 and limit the movement of the carriage 42 in a downward direction. The switch 53 is mounted on the top wall 24 and is provided for bypassing the timer 21. The center leg of the switch 53 is connected to the terminal 47 with one outer leg connected to the guide shaft 40 and the other outer leg connected to the contact bar 29. In one position of the switch 53 the electricity passes through the shaft 40, contact member 43, pins 30 extending from the contact bar 29 and from there to a terminal member 54 which is connected to the mechanism for actuating the telephone alarm 10.

In the opposite position of the switch 53 the electricity passes directly to the contact bar 29 and from there to the terminal 54 completely bypassing the timer 21.

In the use and operation of the invention the electric motor 39 and shaft 35 are arranged to turn at a rate to move the carriage 42 from the top to the bottom of the guide shaft 40, 41 in a given period of time such as 12 hours, one day, one week, one month or any other interval desired. The pins 30 divide the time period into any desired units so that periods of activity of the alarm system and inactivity of the alarm system can be established. When the contact member 43 contacts a pin 30 a circuit is established and remains established until the contact member 43 moves out of contact with any of the pins 30 which breaks the circuit. Any selected number of the pins 30 may be depressed and any selected number thereof may be left undepressed so that the desired intervals of time when the alarm 10 will be inactive can be established so as to permit normal egress and ingress from the home at normal hours without actuating the alarm.

It should be understood of course that any number of pins 30 may be provided in order to establish any desired increments of time.

In the actuation of the device the carriage 42 is started in its uppermost position and after it has moved downwardly sufficiently to contact the switch 52 and break the circuit thereto the cycle is completed. The reversing switch 50 is then actuated to reverse the motor 39 and move the carriage 42 back to the top of the shaft 35 to start a new cycle and the switch 50 is reversed to again start the carriage downwardly on the shaft 35. It should be understood that the motor 39 may be operated in reverse at a much faster speed in order to return to the top of the shaft 35 in a relatively short period of time.

It should be understood that the dialing structure may be modified with gears in order to dial the special emergency number 911 presently being universally adopted throughout the country.

Having thus described the preferred embodiments of the invention it should be understood that numerous structural modifications and adaptations may be resorted to without departing from the spirit of the invention.

I claim:

1. A telephone alarm comprising a mechanism for raising the handset from the telephone base, a mechanism for dialing the emergency number of a telephone system, a recording playing unit for transmitting through the telephone an emergency message, and a timer unit for controlling active and inactive periods of said alarm, said timer unit comprising a housing, a reversible electric motor mounted in said housing and driving an upright threaded shaft therein, a carriage mounted on said threaded shaft for vertical movement in said housing, a pair of guide shafts positioned adjacent to said threaded shaft with said carriage slidably mounted on said guide shafts with at least one of said guide shafts electrically connected to said contact member, an elongate contact bar in said housing extending parallel to said threaded shaft, a plurality of contact pins each including a shaft mounted for horizontal sliding movement in said contact bar and arranged to be manually movable between a position to engage said contact member to a position out of reach of said contact member for establishing periods of activity and periods of inactivity of said telephone alarm, said contact pin shafts each having a pair of spaced detent sockets and a spring biased ball mounted in said contact bar for contact with each of said contact pin shafts to engage in a respective one of said detent sockets to provide means for releasably locking said pins in extended and retracted positions.

* * * * *